April 4, 1944.                      R. D. EVANS                    2,345,923
                    SERIES-CAPACITOR CONTROL TO AVOID HUNTING
                              Filed June 6, 1942
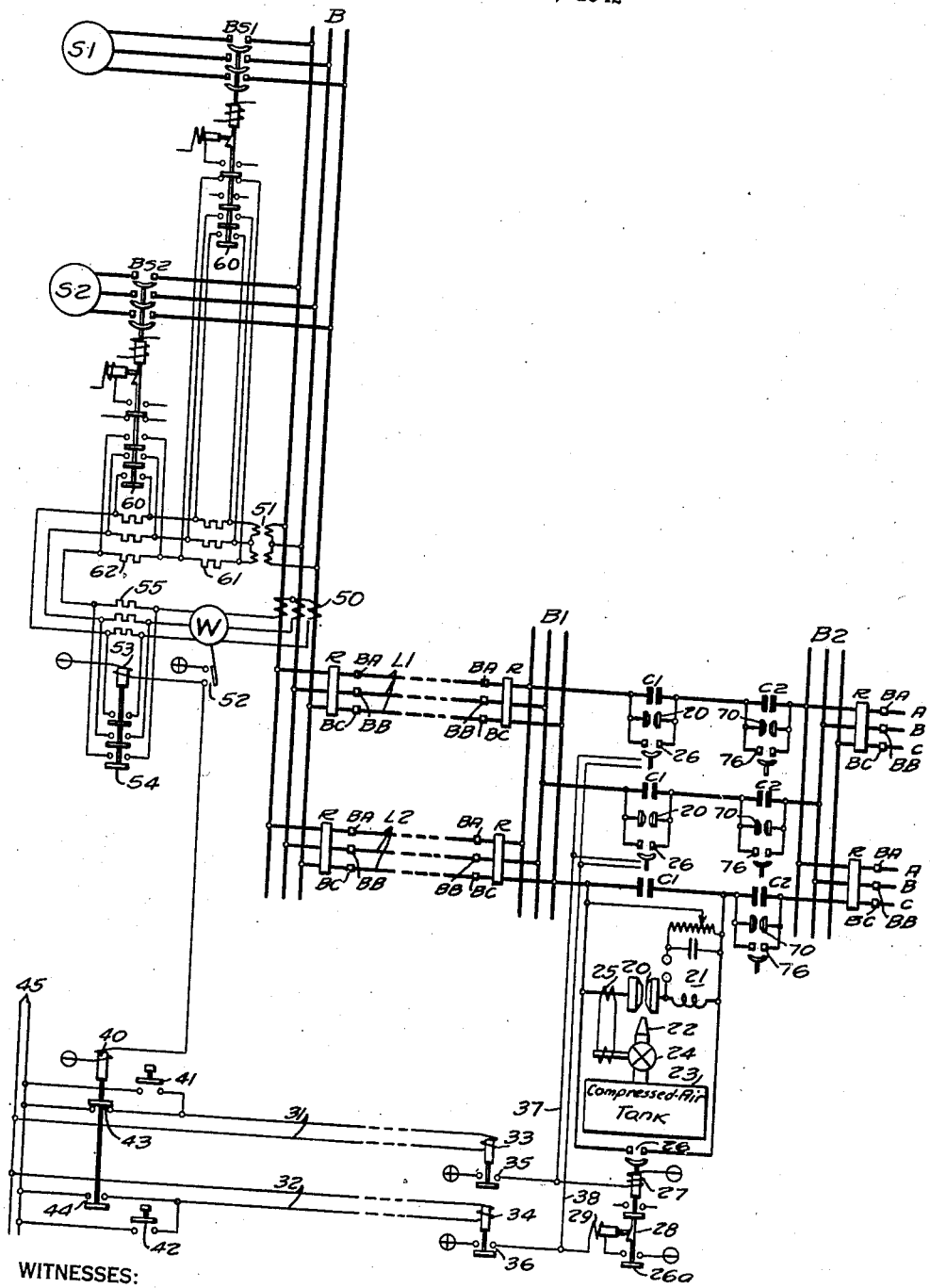
WITNESSES:                                                INVENTOR
                                                       Robert D. Evans.
                                                       BY
                                                              ATTORNEY Patented Apr. 4, 1944

2,345,923

UNITED STATES PATENT OFFICE 2,345,923

SERIES-CAPACITOR CONTROL TO AVOID HUNTING

Robert D. Evans, Swissvale, Pa., assignor to Westinghouse Electric & Manufacturing Company, East Pittsburgh, Pa., a corporation of Pennsylvania Application June 6, 1942, Serial No. 446,079

13 Claims. (Cl. 172—238)

My invention relates to the control and operation of synchronous transmission-systems utilizing serially connected capacitors for increasing the amount of power which may be transmitted over such systems while maintaining stability through fault-conditions.

While it has long been known that it is theoretically possible to increase the power-limits of synchronous transmission-systems through the use of series capacitors, and while it has long been the practice to utilize protective-gap equipment in connection with limited-voltage series-capacitors which are utilized for the purpose of voltage-regulation, the practical utilization of series-capacitors for stability-purposes was for many years economically infeasible because of the uneconomically high cost of capacitors of sufficiently high voltage-rating to be able to withstand the flow of line-currents of fault-magnitude, and because the protective gap-devices, if applied to capacitors of the sizes and ratings required for stability-improvement, would not restore the capacitors to service again, after a protective-gap operation, with sufficient speed to be of any substantial benefit in the way of preventing the system from hunting out of step, or losing stability, as a result of the fault and the resultant line-sectionalizing switching-operation.

Series capacitors of sufficiently high voltage-rating to withstand the flow of fault-currents could be used, as was well known, to obtain more power-transmission over a given line, but the series capacitors would cost more than an additional transmission line, or an additional parallel line-circuit adequate to carry the increased load, particularly if capitalized additional losses were considered. For many years, no serious effort was made to utilize protected series capacitors, of limited voltage-rating, for improving the power-limits of a line, because the protective equipment for such series capacitors would hold the capacitors out of service, not only during the duration of the fault-current flow, but also for a sufficiently long period of time thereafter so that the system would be unable to return to its proper phase-angle of power-transmission, after a fault-responsive switching-operation. The few cycles immediately following a switching operation are the time when a series capacitor would be the most needed, in order to preserve synchronism, if synchronism is to be preserved at all.

Under the foregoing state of affairs, an invention has more recently been made, thoroughly investigated, analytically tried out on a miniature system, and very seriously considered for large-scale application on one of the largest transmission-systems, in which protective equipment was applied in such manner that series capacitors of the limited-voltage class could be adequately protected against damage from excessive voltages as a result of excessive line-currents, while at the same time restoring the protective apparatus to its normal open-circuit condition, thus reinserting the series capacitors into service, with sufficient promptness after the subsidence of the fault-currents to be of service in maintaining stability, and to make it possible, on an economical basis, to successfully utilize series capacitors for transmitting more power over a transmission system, at a lower cost, than the cost of building a duplicate transmission-line or circuit. The invention just mentioned is the subject-matter of a copending application of A. C. Monteith, R. E. Marbury and myself, Serial No. 445,562, filed June 3, 1942. In that case, however, the series capacitors were left connected in the transmission line at all times, except when the capacitors were necessarily shunted by their protective-gap devices during periods of excessive current-flow.

In another application of the same three inventors, Serial No. 446,078, filed June 6, 1942, a limited-voltage series-capacitor, protected by a quickly restoring protective-gap apparatus, was utilized for the purpose of inserting the capacitors in a transmission-line at the time of switching out a faulted line-section, for the purpose of bringing the line-phase-angle of power-transmission, for the critical power-condition where stability was jeopardized, closer to the initial phase-angle which the line required for transmitting that power before the line-reactance had been increased by the switching-operation which was necessary in order to clear the fault. The additional series capacity which was thus inserted in the line was separate from, and in addition to, any series capacitor which might have been utilized for the purpose of increasing the power-limits of the line prior to the switching-operation.

My present invention is an improvement over both of the inventions which have just been mentioned. Any series capacitor which is added for the purpose of improving the power-limits or the stability of a transmission system would have to be added in fairly large quantities, in order to make a significant improvement in the power-limits, comparable to the amount of power-increase obtainable by the building of an additional similar duplicate transmission-line or a duplicate parallel line-section. The increase in the relative power-limits begins to go up at a fairly rapid rate when the amount of the series-capacity impedance exceeds 50% of the total line-reactance. In other words, after a certain amount of capacitance-compensation has been added to a transmission line, a 50% increase in the series capacitance produces a relative power-limit which is more than 50% of the power-limit increase which was originally obtained by the first introduction of capacitance-compensation.

When a large percentage of the line-reactance is thus compensated for, by series capacitance, the effective ratio, R/X, of line-resistance to line-reactance, is considerably increased, thus introducing the danger of spontaneous hunting or negative damping of the transmission system, and in some cases the danger of trouble in bringing large synchronous machines or induction motors up to speed, under certain conditions of operation of the transmission system, particularly at low loads, when operated with large percentages of capacitance-compensation. Recent tests have also indicated that a line having a certain high ratio of resistance to sixty-cycle reactance has less tendency to hunt when the reactance is all inductive than when the line has a higher inductive reactance partly compensated by series capacitive reactance, so that the total sixty-cycle line-reactance is the same in the two cases. In other words, a line having series capacitance has more tendency to hunt at light loads than another line without series capacitance, even though the R/X ratio is the same.

An object of my present invention is to improve the operation of series-capacitor transmission-systems at light loads, by disconnecting some or all of the series capacitance during such conditions, and inserting the same, either automatically or under manual control, when the load-conditions approach the amounts of power at which the ability of the system to ride through faults without losing synchronism or stability begins to become critical.

With the foregoing and other objects in view, my invention consists in the several general and specific means, combinations, systems, apparatus, methods and parts hereinafter described and claimed, and illustrated in the accompanying drawing, the single figure of which is a diagrammatic view of circuits and apparatus embodying my invention in a preferred form of embodiment.

In the drawing, I have shown my invention as being applied to an illustrative synchronous, 60-cycle, three-phase, multi-circuit transmission-system for transmitting power from one or more synchronous generators S1, S2, through a parallel-circuit three-phase line L1 and L2 which has a series-capacitor installation illustrated as comprising two serially connected capacitors C1, C2 connected in series with each phase-conductor A, B and C at some intermediate point, as between two intermediate buses B1 and B2. Each generator S1 and S2 is connected to the sending-end bus B through a gang-operated, or three-pole, generator-breaker BS1 and BS2, respectively. Each line-section L1 and L2 is connected to the buses B and B1 at its respective ends, through single-pole or single-phase line-breakers BA, BB and BC, one for each of the three line-phases A, B and C, and each group of line-breakers is controlled by a suitable relay-apparatus indicated schematically at R for suitably responding to line-faults and quickly effecting the appropriate line-breaker operations in accordance therewith.

The two series-capacitor installations C1 and C2 are, or may be, identical, so that a description of one will suffice for both. The series capacitor C1, for example, is shunted by a main gap-device 20 which is caused to arc over by a trigger-gap device 21 in a manner known in the art. The main gap-device 20 is illustrated as being of the gas-blast type in which the arc is interrupted by the application of a blast of gas or air which is delivered through a nozzle 22, from a compressed-air tank 23 under the control of a solenoid-operated valve 24, which is illustrated as being operated by the gap-current through the main protective-gap 20, as by means of an auxiliary current-transformer 25 in this gap-circuit, as is described more in detail and claimed in an application of L. R. Ludwig and C. V. Fields, Serial No. 437,636, filed April 4, 1942, assigned to the Westinghouse Electric & Manufacturing Company.

Upon the occurrence of line-current of fault-magnitude which traverses the series capacitor, such as C1, the first beginning of an increment in the voltage-drop across the capacitor above its rated value causes an operation of the trigger-gap apparatus 21 which sets up an oscillation which breaks down the arcing-space in the main gap 20, causing the main gap 20 to arc over, thus by-passing the series capacitor C1 with a low-impedance circuit. The line-current flow through the main protective gap 20 energizes the solenoid-actuated valve 24 and turns on the gas-blast, but the time-constants of the valve-circuit, the valve itself, and the air-flow circuits are such that a sufficient time-interval elapses, say four or five cycles, so that adequate time is provided for the normal removal of the fault-condition by an operation of the fault-responsive relay R and line breaker or breakers BA, BB and/or BC.

Each of the series capacitors C1 and C2 is also shunted by an auxiliary circuit breaker having main contacts 26 which are connected in shunt-circuit relation to both the series capacitor, such as the capacitor C1, and the main protective-gap device 20. The gap-breaker 26 is illustrated as having a closing-coil 27, and a breaker-opening operating-mechanism including a latch 28, a trip-coil 29 and auxiliary breaker-switch contacts 26a.

In accordance with my invention, I provide means, preferably, but not necessarily, at the generating station represented by the bus B, for controlling the closing-coil 27 and the tripping-coil 29 of each one of the gap-shunting breakers 26. This control may be either automatically responsive, in a manner which will now be indicated, or it may be effected by manual control under the discretion of the station-operator. This control may be effected by any suitable pilot-channel means, which is indicated, for simplicity of illustration, in the form of pilot-wires 31 and 32, although the pilot-wire representation is intended to be symbolic of any suitable communicating-channel means between the station where the generators S1, S2 are located, and the substation where the series capacitors C1 and C2 are located.

The pilot-channels 31 and 32 are utilized to energize either one of two receiver-relays 33 and 34, which are located at the capacitor-substation containing the buses B1 and B2, and which are provided with make-contacts 35 and 36, respectively, for energizing either the closing-bus 37, or the tripping-bus 38, as the case may be. The closing-bus 37, when energized, energizes the closing-coils 27 of all three of the capacitor-shunting breakers 26 which are associated with the respective CI capacitors in all three of the line-phases A, B and C. In like manner, the tripping-bus 38 energizes the three trip-coils 29 of these three capacitor-shunting breakers 26. In either event, suitable breaker-switches, such as that which is shown at 26a, or any suitable interrupting-means, may be utilized for interrupting the current through the tripping-coil 29, or the closing-coil 27, when the breaker-operation is complete.

At the generator-station represented by the generators S1 and S2 and the bus B, I utilize suitable control-means for the two pilot-channels 31 and 32. I have illustrated this control-means as being both automatic and mechanically controllable, including both an automatically controlled relay 40 and two push-buttons 41 and 42. The control-relay 40 has a back-contact 43, in series with the pilot-channel 31 and a make-contact 44, in series with the pilot-channel 32. The pilot-channels 31 and 32 are illustrated as being energized from a suitable auxiliary bus 45 or other source of power. The push-buttons 41 and 42 are connected in shunt to the relay-contacts 43 and 44, respectively. Thus, when either of the pilot-channels 31 or 32 is energized, it actuates its receiver-relay 33 or 34, as the case may be, and switches the capacitors CI in or out, as the case may be.

The control-relay 40 is illustrated as being energized from a contact-making wattmeter W, which is energized from a bank of current-transformers 50, and a bank of potential-transformers 51, both energized from the generator bus B, the current-transformers 50 being connected in the bus B in such manner as to be interposed between the generators S1 and S2, or other sources of power, and the lines L1 and L2, or other load-devices.

When the load on the transmission-system reaches a sufficiently large amount, which may be a small part of the power-limit of the system, the contact-making wattmeter W responds, and closes its contact 52, thus energizing the control-relay 40, and causing the latter to break its back-contact 43 and close its front-contact 44. The front-contact 44 thereupon energizes the pilot-channel 32, picking up the receiver-relay 34 and energizing the trip-coils 29 of the three capacitor-shunting breakers 26 which are connected in shunt to the three CI capacitors in the three line-phases A, B and C. This causes an opening-operation of the capacitor-breakers 26, thereby inserting the capacitors CI in series with their respective phase-conductors of the transmission-line, in series connection between the two buses B1 and B2.

When the contact-making wattmeter W responds, closing its make-contact 52, this contact also energizes a resetting relay 53, having three make-contacts 54 which by-pass three resistances 55 in the three-phase voltage-supply circuit for the wattmeter W. Thus, when the wattmeter responds, by closing its contact 52, the resetting relay 53 also responds, and closes its make-contacts 54, shunting the wattmeter-resistances 55, so that the wattmeter is sensitized and enabled to retain the closed position of the wattmeter-contacts 52 until the transmission-line load reduces to a value considerably smaller than the initial load-value required to pick up the wattmeter contacts 52, thus avoiding hunting, and unnecessary capacitor-switching operations.

When a transmission-line of the type herein shown is first put into operation, this is done by connecting one of the generators S1 and S2 to the bus B at the sending-end of the line. There are certain types of lines upon which difficulty may be experienced in bringing large synchronous machines, or large induction motors, up to speed, on a lightly-loaded line, because of hunting-difficulties, or slow-speed exchanges of power between the two ends of the line, at a natural period of vibration which may be of the order of 40 to 80 line-frequency cycles, in a 60-cycle system. Thus, it would take a matter of several seconds for any series hunting to build up, in such a system. Also when such a system is lightly loaded, even after it has been started up, spontaneous hunting-difficulties, due to negative damping, may be encountered at extremely light loads, particularly when the ratio of R to X is large, as when part of the line-reactance X is compensated for by series capacitors. These hunting-troubles are much more in evidence, with synchronous machines S1 or S2 which are not provided with damper-windings, than with machines which are provided with damper-windings.

Although it is not generally economical to operate a transmission system of the size and cost contemplated by my invention, except at transmitted loads which are a reasonably high percent of the ultimate power-limit of the line, so that, for reasons of economy, such a line is ordinarily not operated, except when its load is adjusted to be reasonably large, nevertheless the danger of spontaneous hunting is a possible danger, either upon the initial starting of a line having a high ratio of resistance to reactance, or in the moments of operation of such a line, before its load can be adjusted to a value high enough so that the danger of spontaneous hunting is avoided.

The use of a load-responsive wattmeter W, having contacts 52 which are open at no-load, and which close only upon the attainment of a certain predetermined minimum load, is thus seen to be a useful adjunct to series-capacitor systems, for stability-improvement, by making the series capacitors available during heavy-load operation, when stability is a critical factor of consideration, and keeping these series capacitors out of service under the light-load conditions when spontaneous hunting may be developed. My invention thus makes it possible to retain all of the advantages of the series capacitance, without running any hunting-risks because of the increase in the effective ratio R/X which is caused by the compensation of some of the line-reactance by the series capacitors which are needed, when the line is heavily loaded, in order to enable the line to ride through faults or other disturbances.

Usually, as the load increases, on a transmission system of the nature herein described, additional generator-capacity is added only as needed. Thus, the line will be started into service, on relatively light loads, with only a single one of the generators S1 or S2 in service. As the load increases, a second generator is added, by closing its breaker BS1 or BS2 as the case may be. Since generators, in general, have a lower R/X ratio than the line, the addition of another generator reduces the R/X ratio of the system, and makes it feasible to leave the series capacitor in the line at lighter loads, as the load decreases, or to insert the series capacitor into circuit at a smaller critical load, as the loading increases.

In the normal operation of a transmission system, however, it would not be usual for a second generator to be connected onto the sending-end bus B, when the transmission-line was so lightly loaded that there would be a possibility of danger of spontaneous hunting; and ordinarily the loading on the transmission line would increase, or be increased, soon after the addition of a second generator at the sending-end. Thus, in general, it would be undesirable to take out of service any series capacitor which had been added before a second generator was connected, at the sending end, or, in the case of decreasing loadings on the transmission-system, such as to warrant the disconnection of one of a plurality of generators from the sending-end, it will be, in general, better to remove the series capacitors from service, than to restore series capacitors which had previously been automatically removed because of the sharp fall in transmission-loading prior to the removal of one of the generators from the sending end.

While my invention is thus not limited to the precise nature in which response is made to the number of generators S1 and S2 which are connected to the transmission system at the generator-end, I have illustrated a system which I believe, at present, to be the preferred one, in which the addition of each generator is caused to sensitize the contact-making wattmeter W, so as to cause it to respond, by picking up on increasing loads, or dropping out on decreasing loads, at a lower critical value of wattage, after the generator has been added, than before the addition of said generator.

In accordance with the principle just discussed, I have shown each of the generator-breakers BS1 and BS2 as being provided with three auxiliary make-contacts or breaker switches 60, which are open when the breaker is open, and closed when the breaker is closed. These auxiliary breaker-switches 60 are utilized, in each case, to short-circuit a set of wattmeter-setting resistors 61 and 62, as the case may be, which are connected in series with the voltage-terminals of the wattmeter W, so that, when the generator-breaker BS1 is closed, it will short-circuit the resistors 61 in the wattmeter circuit, and when the generator-breaker BS2 is closed, it will short-circuit the resistors 62 in the wattmeter-circuit. I desire this generator-connection-responsive means to be regarded as symbolic, however, of any k'nd of control for effecting the connection and disconnection of the series capacitors C1 in response to the generator-capacity in circuit, or in response to the number of generators which are connected in circuit.

In the foregoing discussion, I have assumed a general case in which only a part of the series capacitors C1 and C2 is affected or controlled by my light-load capacitor-controlling means. Thus my capacitor-controlling buses 37 and 38 have been shown as being connected to the capacitor-shunting breakers 26 of only the controlled series capacitors C1, and not the uncontrolled series capacitors C2, which are left in circuit, independently of the light-load control. It is understood, of course, that these other capacitors, C2, may be omitted altogether, so that my light-load anti-hunting control would be effective with respect to all of the series capacity which is connected in the line. It will also be understood that the additional, uncontrolled, series capacitors C2, if present, would be provided with appropriate protection, symbolized by gaps 70 and capacitor-shunting breakers 76, which might be physically similar to the corresponding elements 20 and 26 already described, except that the breaker-control would be different.

I realize that my present invention is not universally needed on all electrical systems in which series capacitors are utilized, as there are many such systems in which spontaneous hunting-problems are non-existent, even at no-load; and when there are no hunting-difficulties, it is usually desirable to leave the series capacitors in circuit, and in particular to have the series-capacitors in circuit at the moment of the initial putting into service of the transmission system, so that the series capacitors may be available to assist in controlling the sometimes excessive voltage of an open-ended transmission-system having heavy line-to-ground distributed-capacity-currents.

Notwithstanding these facts, there are definitely certain situations in which hunting problems may exist, and when such problems do exist, or when the danger or fear of hunting may exist in the minds of the engineers responsible for the operation of a transmission-system, such circumstances constitute a serious detriment, blocking the use and adoption of series capacitors, as a means for improving the stability of a transmission system, or for other purposes; and my present invention provides an inexpensive and reliable means for removing any possible danger of hunting, as a result of series capacitors, while at the same time detracting nothing from the usefulness of the series capacitors under the heavy-load conditions when the capacitors are the most sorely needed.

My present invention is also useful in distribution-circuits in which saturated-iron conditions in unloaded distribution-transformers on a newly-energized distribution-circuit may, under certain conditions, result in a undirectional charge on the series capacitor, enduring for several cycles and periodically reversing, as pointed out in the Buell Patent No. 2,120,855, granted June 14, 1938.

While I have illustrated my invention in a single preferred form of embodiment, and while I have described its principles and theory of operation in the manner best known to me at present, I wish it to be understood that my invention, in its broadest aspects, is not limited to any particular installation or theory or mode of operation. I desire, therefore, that the appended claims shall be accorded the broadest construction consistent with their language.

I claim as my invention:

1. An alternating-current system including a transmission-line, series-capacitance normally in circuit therewith, and means approximately responsive to the loading-conditions of the system for by-passing some or all of the series-capacitance during light-load system-conditions and for removing said light-load by-pass under system-conditions accompanied by heavier loading-conditions.

2. A synchronous transmission-system including a generator-station, a series-capacitor station at a location removed from the generator-station, capacitor-shunting by-passing-means at the series-capacitor station, a remote-control means for controlling said by-passing-means from the generator-station, and controlling-means at said generator-station for controlling said remote-control means, said controlling-means being approximately responsive to the loading-conditions of the system for causing at least some of the series-capacitance at the series-capacitor station to be by-passed during light-load system-conditions and for removing said light-load by-pass under system-conditions accompanied by heavier loading-conditions.

3. A synchronous transmission-system of a type which is normally moderately heavily loaded, comprising, in combination, a transmission line, series-capacitance normally in circuit therewith in such quantities as to cause objectionable conditions under some light-load transmission-conditions but contributing materially to system-operation under heavy-load operating-conditions, and means approximately responsive to the loading-conditions of the system for by-passing some or all of the series-capacitance during light-load system-conditions and for removing said light-load by-pass under system-conditions accompanied by heavier loading-conditions.

4. A synchronous transmission-system of a type which is normally moderately heavily loaded, comprising, in combination, a transmission line, series-capacitance normally in circuit therewith in such quantities as to cause objectionable conditions under some light-load transmission-conditions but contributing materially to system-stability under heavy-load operating-conditions, a plurality of generators normally connected to said system, switching-means for disconnecting one or more of said generators, and means responsive, in some manner, to the number of generators in service for controlling the amount of series-capacitance in the line.

5. The invention as defined in claim 1, characterized by said loading-responsive means including a contact-making wattmeter.

6. The invention as defined in claim 2, characterized by said controlling-means including a contact-making wattmeter.

7. The invention as defined in claim 3, characterized by said loading-responsive means including a contact-making wattmeter.

8. The invention as defined in claim 3, characterized by said system normally including a plurality of generators connected thereto, and switching-means for disconnecting one or more of said generators, said loading-responsive means including a contact-making wattmeter and means for changing the wattmeter-calibration in response to the connection and disconnection of generators.

9. The invention as defined in claim 1, characterized by said loading-responsive means including a contact-making wattmeter and means for sensitizing the wattmeter when it responds 10. The invention as defined in claim 2, characterized by said controlling-means including a contact-making wattmeter and means for sensitizing the wattmeter when it responds to a minimum value of loading, during increasing-load response.

11. The invention as defined in claim 3, characterized by said loading-responsive means including a contact-making wattmeter and means for sensitizing the wattmeter when it responds to a minimum value of loading, during increasing-load response.

12. An alternating-current system including a transmission-line, series-capacitance in series-circuit relation thereto, circuit-make-and-break by-passing means for at times by-passing at least some of said series-capacitance, control-means for said by-passing means, line-energized relay-means which is energized to actuated position only after said line is in a predetermined operating-condition, and control-circuit means utilizing an actuated condition of said relay-means for causing said by-passing means to be in an open-circuit condition, and utilizing a non-actuated condition of said relay-means for causing said by-passing means to be in a closed-circuit condition.

13. The method of operating an alternating-current transmission-system, including the steps of operating said system, during normal, moderately heavily loaded operating-conditions, with a plurality of generators connected thereto, and with serially included capacitance in such quantities as to cause objectional conditions under some light-load transmission-conditions but contributing materially to system-stability under heavy-load operating-conditions, varying the number of connected generators in approximate conformity to the range of loading on the system, and approximately simultaneously by-passing some or all of the series-capacitance when the number of connected generators is reduced to a predetermined minimum.

ROBERT D. EVANS.